(12) United States Patent
Linnewiel

(10) Patent No.: US 6,447,015 B1
(45) Date of Patent: Sep. 10, 2002

(54) TAMPER EVIDENT TAPES AND LABELS

(76) Inventor: Ron Linnewiel, 38 Armon Street Neve Ilan, 81512 Yavneh (IL)

( * ) Notice: Subject to any disclaimer, the term of this patent is extended or adjusted under 35 U.S.C. 154(b) by 0 days.

(21) Appl. No.: 09/700,977

(22) PCT Filed: May 10, 1999

(86) PCT No.: PCT/IL99/00243
§ 371 (c)(1),
(2), (4) Date: Feb. 26, 2001

(87) PCT Pub. No.: WO99/61240
PCT Pub. Date: Dec. 2, 1999

(30) Foreign Application Priority Data

May 25, 1998 (IL) .............................................. 124635

(51) Int. Cl.$^7$ ............................................. B42D 15/00
(52) U.S. Cl. ..................... 283/81; 206/807; 229/102; 283/94; 283/98; 428/34.3; 428/43
(58) Field of Search ............................ 206/411, 807; 229/102; 283/81, 91, 93, 94, 98, 99, 101, 103, 108, 110; 428/34.2, 34.3, 41.7, 42.2, 43

(56) References Cited

U.S. PATENT DOCUMENTS

| | | | |
|---|---|---|---|
| 4,876,123 A | 10/1989 | Rivera et al. | 428/34.2 |
| 4,883,182 A | 11/1989 | Hughes | 206/534 |
| 4,941,196 A * | 7/1990 | Edelman et al. | 383/5 |
| 4,972,953 A * | 11/1990 | Friedman et al. | 206/459 |
| 4,998,666 A * | 3/1991 | Ewan | 229/102 |
| 5,060,848 A * | 10/1991 | Ewan | 229/102 |
| 5,225,162 A * | 7/1993 | Scoville | 422/56 |
| 5,325,721 A * | 7/1994 | Pendergrass, Jr. | 73/762 |
| 5,411,295 A * | 5/1995 | Bates et al. | 283/91 |
| 5,631,068 A * | 5/1997 | Smith | 428/195 |
| 5,704,652 A * | 1/1998 | Curiel | 283/94 |
| 6,033,762 A * | 3/2000 | Decker | 428/201 |
| 6,087,075 A * | 7/2000 | Kler et al. | 430/321 |
| 6,096,387 A * | 8/2000 | Decker | 427/510 |
| 6,149,203 A * | 11/2000 | Hanlon | 283/72 |
| 6,196,383 B1 * | 3/2001 | Pinchen et al. | 206/264 |
| 6,264,033 B1 * | 7/2001 | Kannabiran et al. | 206/459.1 |
| 6,270,256 B1 * | 8/2001 | Todman | 383/5 |
| 2001/0022280 A1 * | 9/2001 | Kannabiran et al. | 206/459.1 |

* cited by examiner

Primary Examiner—A. L. Wellington
Assistant Examiner—Monica Carter
(74) Attorney, Agent, or Firm—Davidson, Davidson & Kappel, LLC

(57) ABSTRACT

A tamper-evident tape or label to be adhered to various items, like security envelopes, bags, packages, markings, price tags, etc. The tape or label comprising a base layer made of a pliable light transmissive plastic material, and the base layer being provided with an upper face and an opposing bottom face, such base layer being adherable to the said items by the bottom face thereof. The base layer being provided with at least one tamper-evident means revealable when an unauthorized attempt to remove said tape or label from the said items has taken place, and the said base layer being provided with a preventing means to prevent direct access to the upper face thereof.

12 Claims, 7 Drawing Sheets

TAMPER EVIDENT TAPES AND LABELS

TECHNICAL FIELD

This invention relates to security sealing and marking of different items and products, and particularly for tamper evident tapes and labels having multiple layers, at least one layer attachable to different items and products, to clearly indicate that the tamper evident tape or label was tampered with thus providing an indicator as to the security condition of the container to which the tamper evident tape or label is attached thereto.

BACKGROUND ART

There is constant need for evident tampering tapes and labels, protecting items, containers and products such as envelopes, from opening without leaving evidence of tampering or from transferring labels from one product to another without leaving evidence of tampering. The need for evident tampering tapes and labels results from increasing worldwide commercial activities in sealed containers such as security envelopes and from the increased used of pricing and other labels on containers and products containing valuable goods or merchandize.

Previously known tamper evident tapes and labels have not been satisfactory. Known tamper evident tapes and labels are scored tapes that can easily be removed from products such as envelopes through use of means such as adhesive tape. Known tamper evident tapes can be tampered with unnoticeably in low or high temperature. Some tapes and labels designed to solve known problems are costly.

One known method for tamper evident tapes and labels uses hidden lettering on one part of the tape, such lettering or insignia is revealed when the tape is tampered with.

Such tapes do not provide evidence of tampering with the container it is applied to if the tape is removed or lifted in high or low temperatures. When the tape is heated to high temperature of about 80–90 degrees centigrade the attaching layer of the tape attaching the tape to the container becomes weakened and it is therefore easily removable and re-attachable without trace and without exposing the hidden lettering.

Another known method for tamper evident tapes and labels uses color changing heat sensitive means embodied within the tape. Such tapes change color when the tape is exposed to increased temperature, generally of around 80 degrees centigrade. Such tapes however react to prolonged exposure to temperatures of about 60 degrees centigrade and change color thus giving false indication of tampering with the tape.

Another known method for tamper evident tapes and labels uses a ape at least one layer of which includes continuous webs of fracture or cuts in a known and pre-designated manner. When removed such tape will fragment and the interconnecting portion between the tape and the container or product to which it is attached will indicate that the tape has been tampered with. This method of protection used by tamper evident tapes and labels may be circumvented through attaching a tape that is adherable on one side on the layer that includes the continuous webs of fracture or cuts and lift the tape as a whole without creating any discernable fragments in the continuous webs of fracture.

When an additional layer of material is attached to the layer of continuous webs of fracture it is possible, under certain conditions, to remove and re-attach the tape without shown evidence that the tape was tampered with.

In making the present invention, it has been observed that there is a distinct need to overcome the inadequacies of the previously known tapes, to ensure that a tamper evident tape indicate any attempt to tamper with a tape or label, because previously known tapes include the drawbacks outlined here above.

DISCLOSURE OF THE INVENTION

In accordance with the present invention there is provided a new and unique tamper evident tape and label which provides additional security and clear and unambiguous evidence of the condition of the container.

BEST MODE FOR CARRYING OUT THE INVENTION

Figure 1:
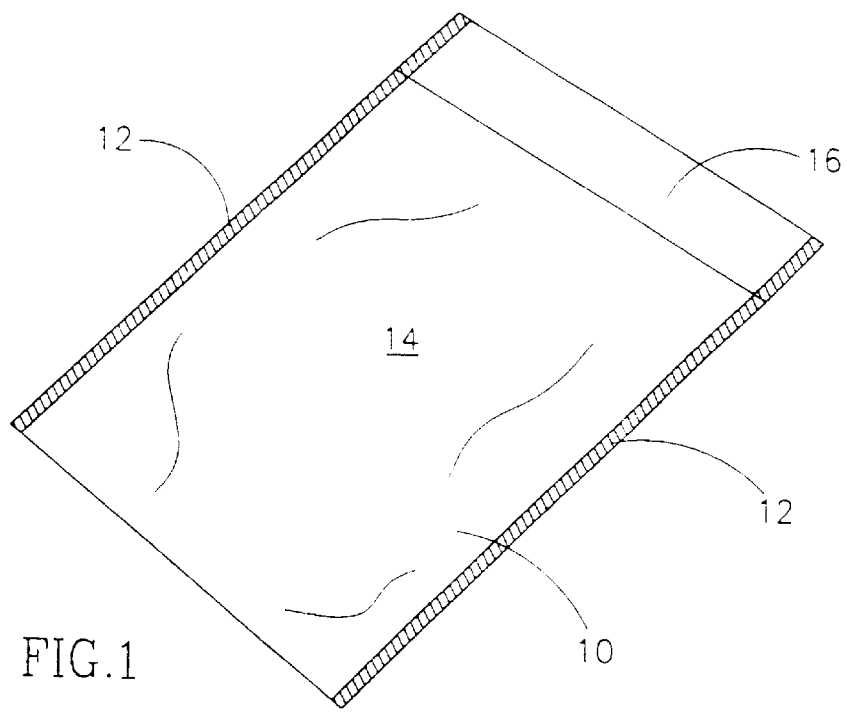
FIG. 1 shows schematically a package to be sealed

With reference to FIG. 1 there is shown a security container for keeping inside of various items like papers, valuable goods or merchandise. The container is formed as a bag or envelope 10 made of a sheet of plastic material, for example polyethylene, cupboard, paper or any other suitable impact resistant material. The envelope comprises plurality of edges sealed along margins 12 so as to define a receptacle portion 14 for receiving the items. A certain part of the envelope is unsealed to define an access portion 16 through which the items can be placed into the receptacle portion. The envelope is provided with a tamper-evident tape 20 enabling to reveal whether an unauthorized attempt to open the envelope has taken place after it is sealed. The construction of the tape in accordance with the present invention will be explained in details later on. Here it should only be mentioned that the tape is provided on that surface thereof which faces the envelope with an adhesive covered by a removable protective liner. By virtue of this provision it is possible to expose the adhesive so as to adhere the tape firmly to the envelope and thus to seal thereof.

Figure 2:
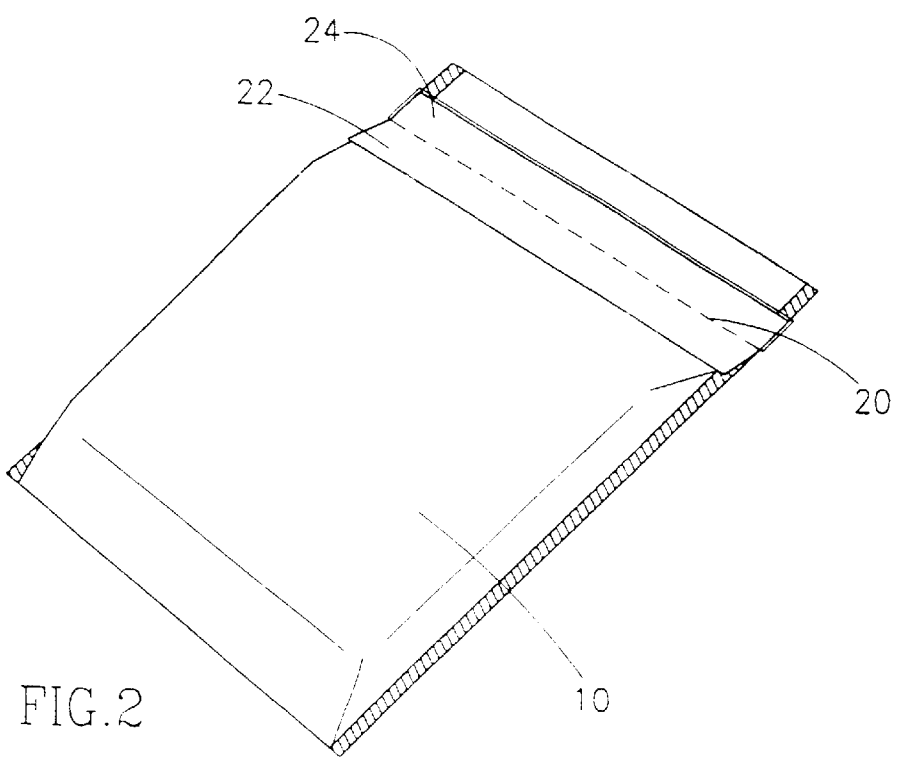
FIG. 2 present the package shown in FIG. 1 before it is sealed and a tamper evident tape manufactured from film and attached thereto
Figure 3:
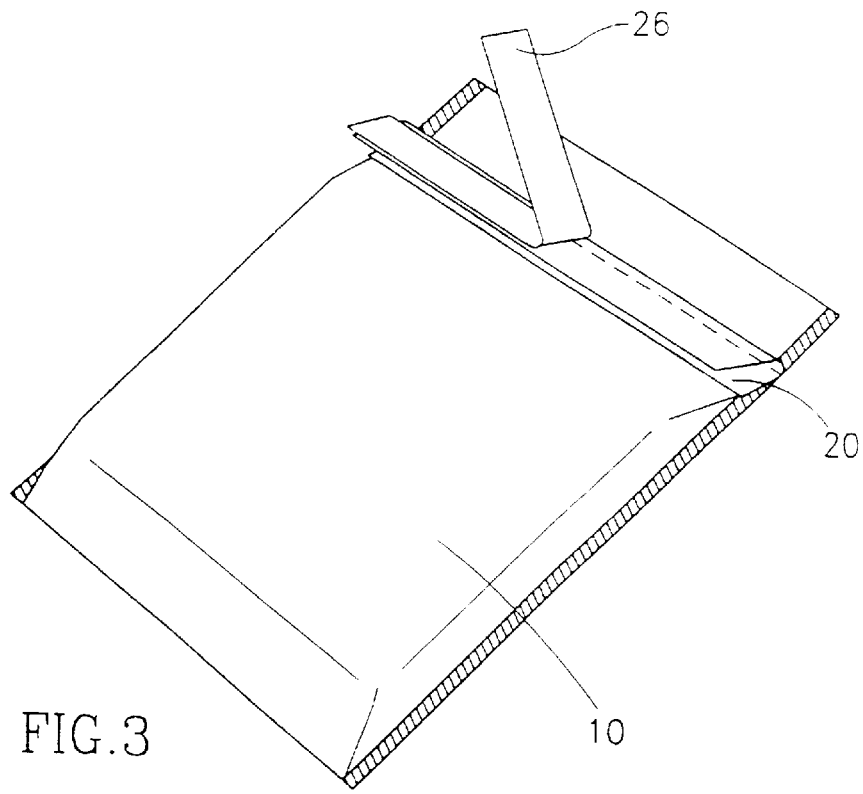
FIG. 3 depicts pealing off the covering layer from the tamper evident tape

In FIG. 2 there is shown that the tape is adhered to the envelope after the protective liner is removed from an attachment portion 22 thereof. The tape is firmly adhered to the receptacle portion of the envelope. The sealing portion 24 of the tape is still covered by the second part of protective liner 26 (as shown in FIG. 3) and is not adhered yet. The border between the envelope's receptacle portion and access portion is shown by a dotted line and one can clearly see that the tape is wide enough to overlap the access portion and to be adhered thereto. It should be realized that adhering of the tape to the envelope as described above can be effected either manually or automatically. In the last case it is advantageous to combine in one process the step of sealing and cutting of the envelope from the sheet material and the step of attaching the tape to the receptacle portion thereof.

Figure 4:
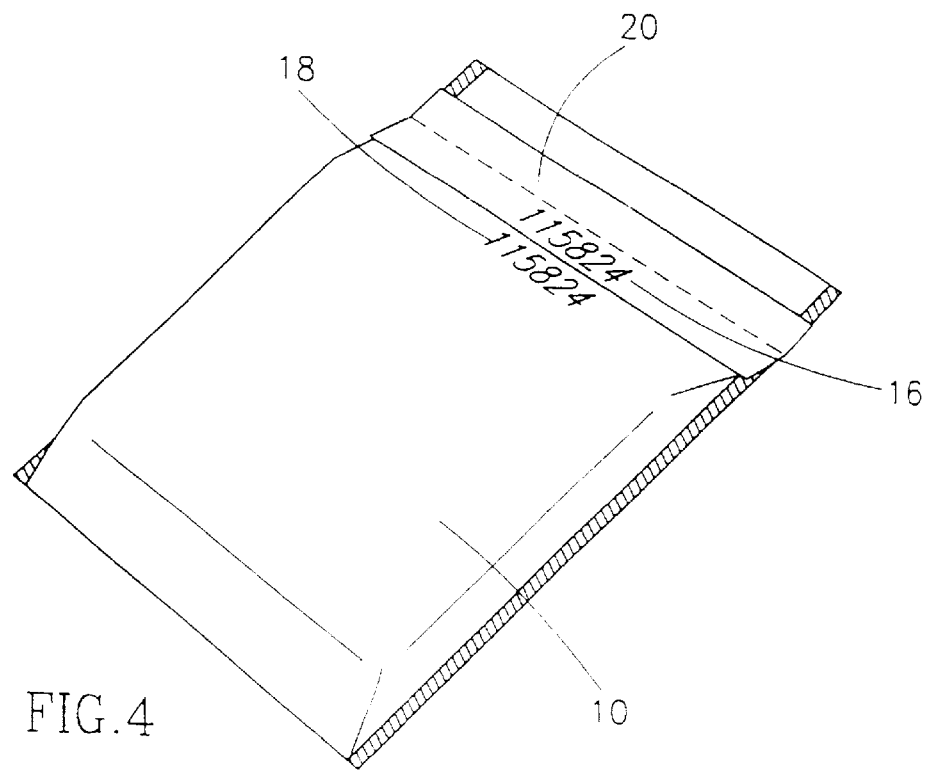
FIG. 4 shows the package after it is sealed

Now with reference to FIG. 3 one can see that if the sealing portion is bent back and the second part of protective liner 26 is removed therefrom it can be adhered to the access portion of the envelope so as to seal it. The sealed envelope is shown in FIG. 4. In practice the tape is made of a pliable material which can be translucent. By virtue of this provision one can see through it an identification number 16 printed on the envelope and to check it with the same number 18 printed outside the tape.

Figure 5:
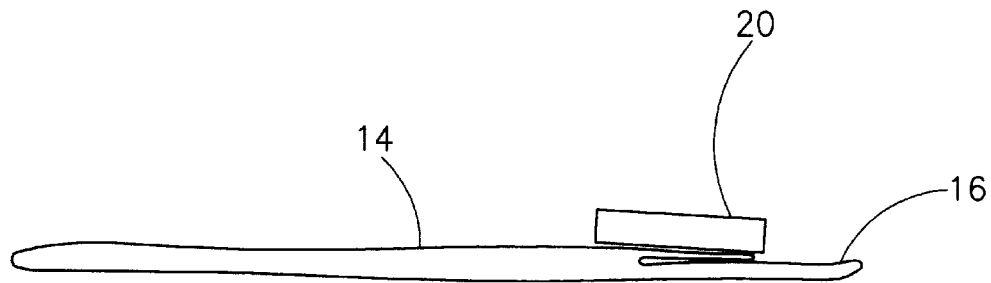
FIG. 5 is a cross-sectional view of the sealed package with the tamper evident tape attached thereto
Figure 6A:
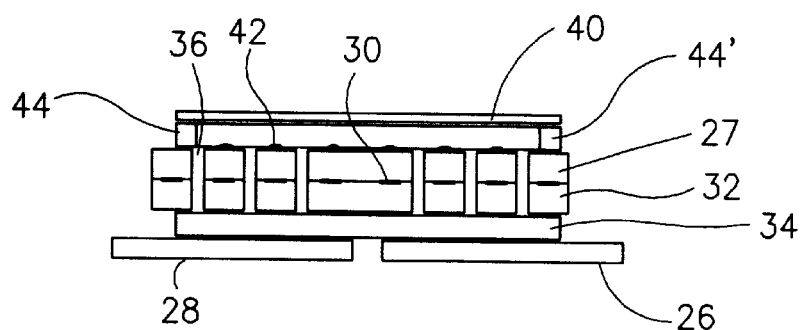
FIG. 6a is enlarged cross-sectional view of the tamper evident tape showing its structure

Having explained how the tape of the present invention is used for sealing of an envelope the tape's construction will be disclosed in details. In FIG. 5 it is shown the tape after it is adhered to the envelope by its bottom face provided with the adhesive. In FIG. 6a it is shown the tape's cross section in the condition when the tape is still not in use and its bottom face coated with an adhesive is covered by the protective liner. The tape comprises a base layer 27 made preferably of a plastic film, for example Bi Oriented Polypropilen. Preferably, the thickness of this layer is 40–60 microns and it is translucent. The bottom face of this layer can be directed towards the envelope's surface and is provided with various tamper-evident means which are capable to reveal an attempt to tamper with the tape after sealing the envelope. The tampering means may comprise a security pattern 30 printed on the bottom face of the base layer. The security pattern can consist of letters and/or digits or other markings or be a graphic pattern. In practice the security pattern can be applied to the base layer by a plasma coating. The pattern is painted by a paint layer 32 so as to tint the base layer and thus render the pattern to be invisible via the base layer all the time the tape is intact. If an attempt to remove the tape from the envelope at low temperature has taken place the security pattern remains on the envelope's surface and becomes visible thus revealing the attempt of tampering with the envelope.

Figure 8:
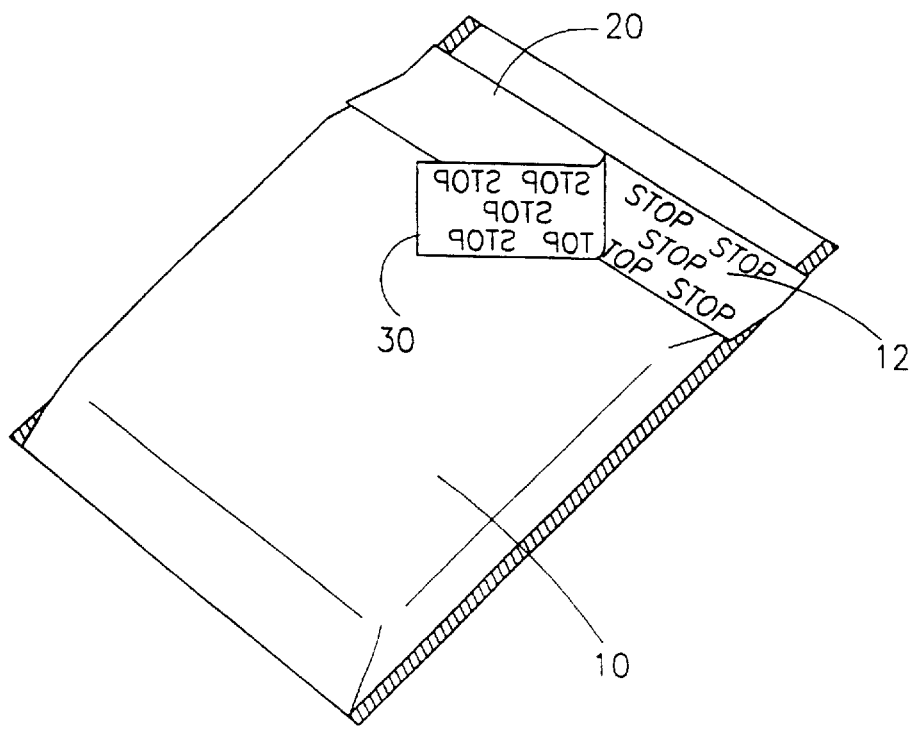
FIG. 8 shows schematically an attempt to remove the tape at low or ambient temperatures, resulting in revealing the security pattern
Figure 9:
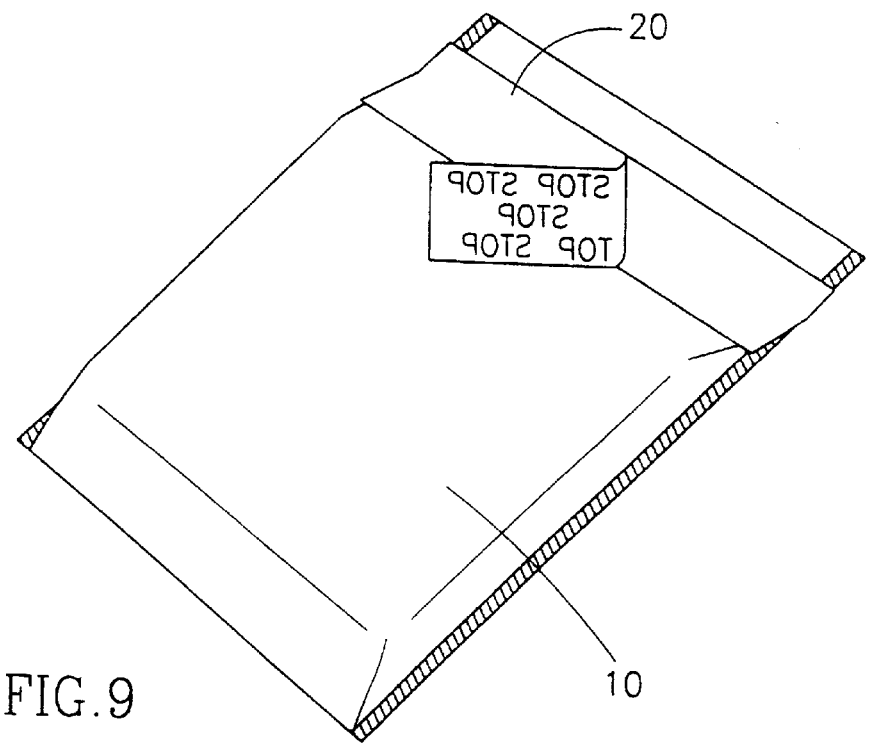
FIG. 9 shows schematically one attempt to remove the tape

This situation is schematically depicted in FIG. 8. The situation of removing the tape together with the security pattern is seen in FIG. 9. The paint layer is coated by an adhesive 34, which is covered by the removable protective liner. In order to enable exposing the adhesive covering the attachment portion 22 without exposing the adhesive covering the sealing portion 24 the protective liner consists of two separate parts 26,28, which can be removed independently. In practice the suitable adhesive is commercially available glue, for example acrylic-based glue. In practice the most suitable adhesive can be chosen by a skilled in the art person after considering surface energy of the plastic material the envelope is made of. Preferably, the thickness of the adhesive is 20–100 microns. The protective liner can be made of a commercially available siliconized film. Preferably, the thickness of the liner is 20–100 microns, being preferably 50 microns.

Figure 7:
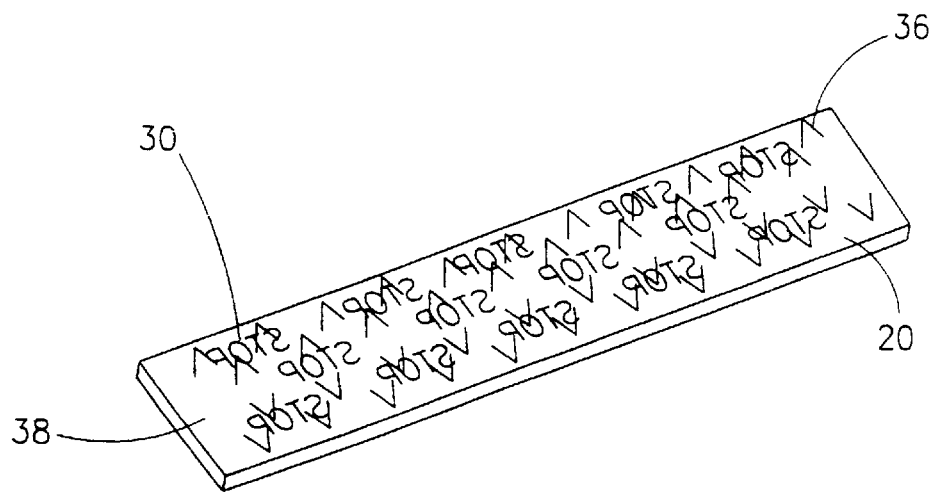
FIG. 7 is a top view of the tamper evident tape
Figure 10:
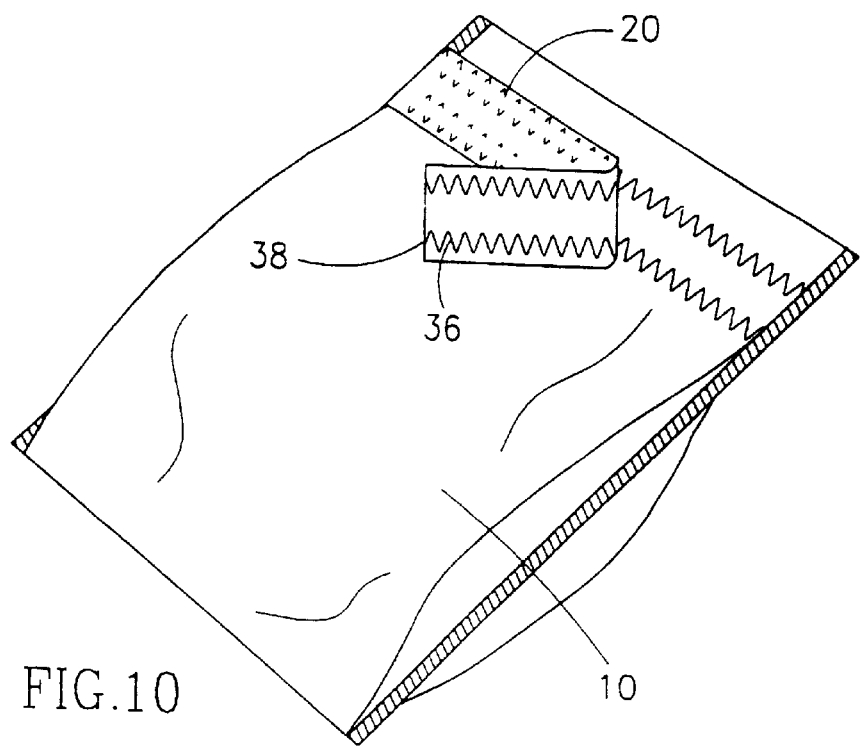
FIG. 10 shows schematically another attempt to remove a tape having a plurality of cuts resulting in the tape disruption-ease

In addition to the above described tamper-evident means the base layer can be provided also with additional tampering-evident means rendering the base layer easily disruptable if one tries to remove thereof from the envelope. These additional new means comprises a plurality of through-going scores or cuts 36, which are cut through the base layer up to the adhesive. The scores or cuts are arranged on the base layer preferably across its entire surface. The shape of the cuts can be different, but in practice they are configured as discrete V-like cuts best seen in FIG. 7. In practice in order to render the base layer even more disruptable it preferably advantageous to distribute the cuts laterally along the tape length so as to provide a region 38 in the middle of the tape, which is free of the cuts. The width of the free of cuts region is preferably about 8 mm. By virtue of the scores or cuts made in the base layer the tape becomes severely disrupted when someone attempt to remove it from the envelope and thus an unequivocal evidence of the tampering attempt is provided. This situation is schematically shown in FIG. 10.

In accordance with the present invention the base layer is provided with a covering layer 40, attachable thereto and constituting a barrier, preventing direct access to the base layer. The purpose of this protective layer is to eliminate a possibility of attaching an external self-adhesive tape to the upper face of the base layer so as to detach the entire tape upon heating thereof without tearing the base film 27 and without leaving any visible evidence of the tampering. The covering layer is made of a translucent polymeric material, for example bi-oriented or mono-oriented polypropylene, polyethylene, PVC or other. Preferably, the thickness of this layer is 10–20 microns. The face of the covering layer which is directed towards the base layer is provided with a graphic pattern, for example intersecting lines 42, which are schematically designated as points in the cross-sectional view shown in FIG. 6a.

The covering layer is connected to the base layer for example by welding. The connection between the base and covering layers is discontinuous in the sense that the welding, gluing or other means for attaching is done in several locations. It is preferable if those locations are distributed laterally and longitudinally along the tape. With reference to FIG. 6a the connection locations 44,44 are shown at both long lateral sides of the tape. It can be readily appreciated that by virtue of discontinuous connection the covering layer can be easy disrupted and its pattern becomes unavoidably deteriorated, thus providing evidence that the tampering with the tape has taken place. The short lateral sides of the covering layer are not connected to the base layer and in order to prevent accessing the upper face of the base layer these sides are sealed at both ends of the envelope's edges along margins 12.

It can be appreciated that by virtue of the above described tamper-evident means in combination with the covering layer attached to the base layer it becomes possible to prevent any conceivable attempt of tampering with the tape without leaving an unequivocal evidence that such an attempt has taken place. This possibility remains irrespective whether the tampering with the tape was effected by heating, cooling or by detaching thereof by a self-adhesive tape.

Figure 6B:
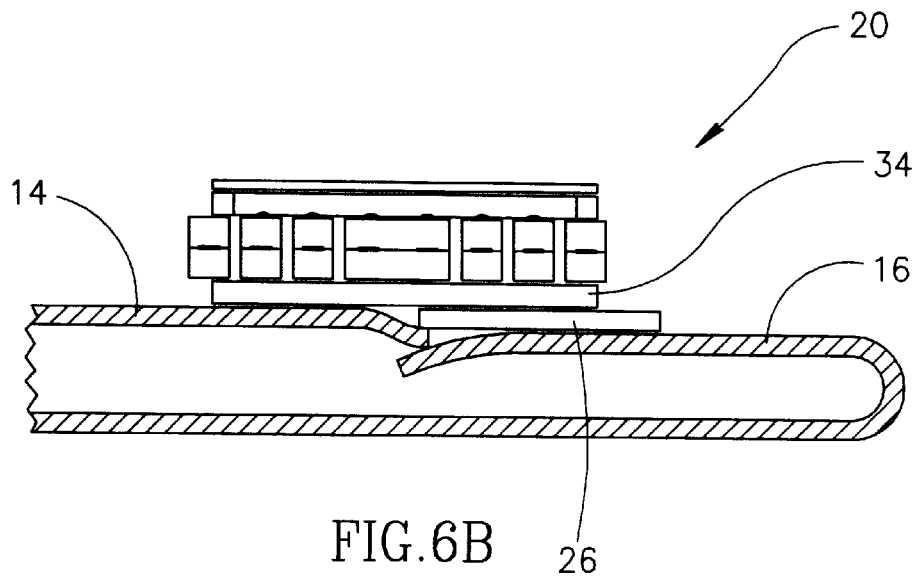
FIG. 6b is enlarged view of detail A marked in FIG. 5

With reference to FIG. 6b it is shown the tape firmly adhered by its adhering portion to the receptacle portion 14 of the envelope, while its sealing portion is still covered by the adhesive 34. Upon peeling off the protective liner part the adhesive becomes exposed and the sealing portion of the tape can be firmly attached to the corresponding access portion 16 of the envelope so as to seal thereof.

Figure 11:
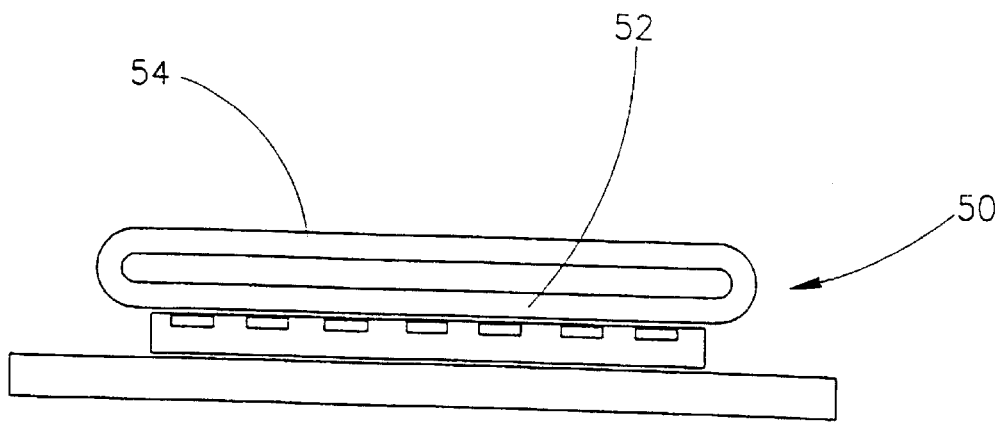
FIG. 11 is a cross-section of the tamper evident tape manufactured from sleeve film

The above explained tape employs the base layer and the covering layer which are separately manufactured from the plastic film or other material and connected there between. With reference to FIG. 11 there is shown an additional embodiment of the present invention in which a tape 50 is manufactured from the blown polymer film and is configured as a sleeve. In this embodiment one half 52 of the sleeve constitutes the base layer, while the opposite half 54 thereof, constitutes the protective layer. As in the previous embodiment the outwardly facing side of the base layer is provided with the above-described tamper-evident means and is covered by an adhesive. The adhesive is closed by the removable protective liner.

Figure 12:
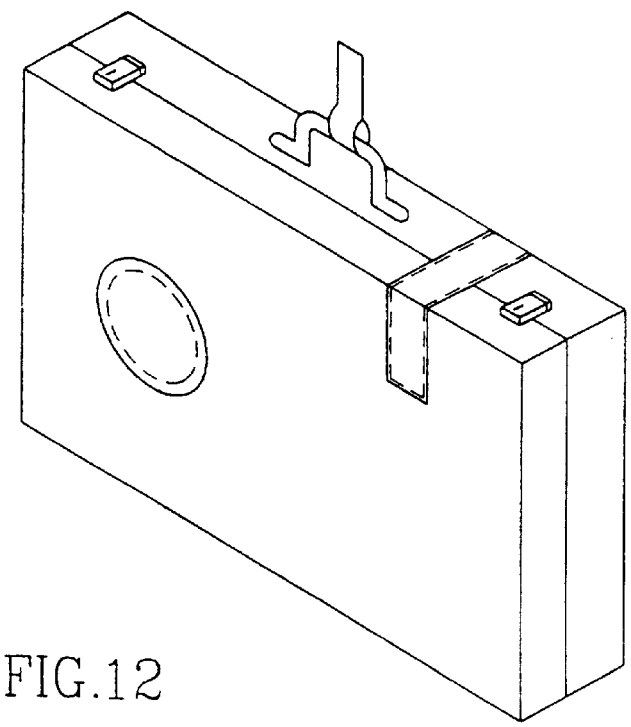
FIG. 12 depicts a suitcase having the tamper-evident label of the present invention attached to the suitcase and to its handle
Figure 13:
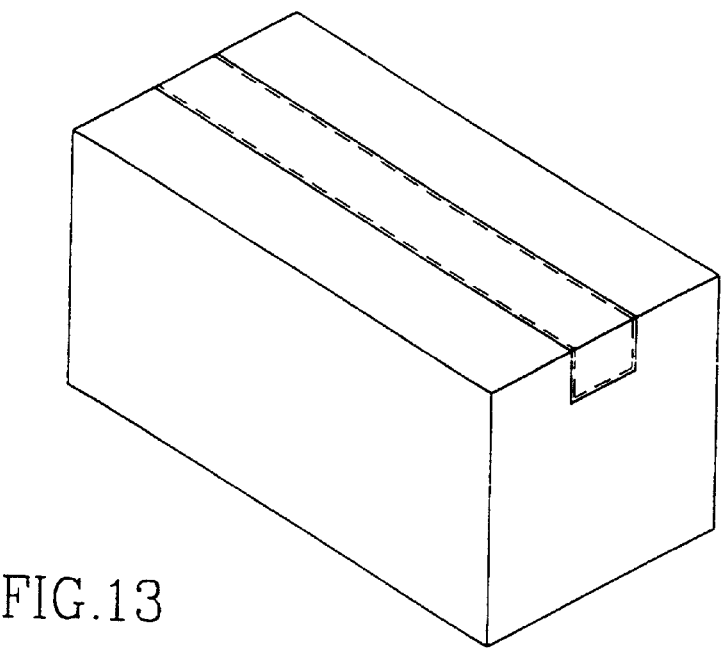
FIG. 13 depicts a box sealed with the tamper evident label of the present invention
Figure 14:
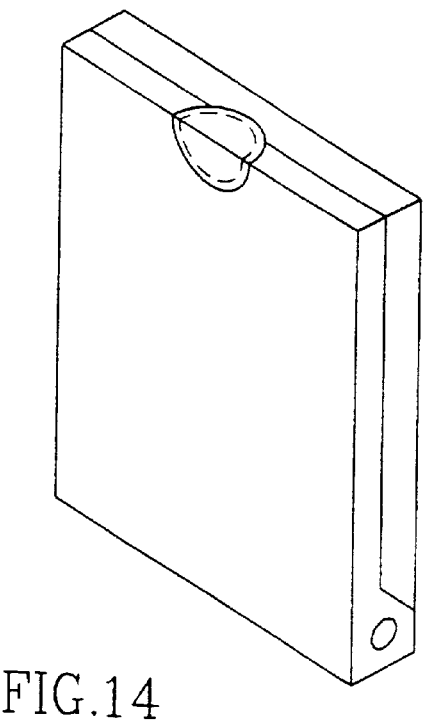
FIG. 14 depicts a CD sealed with the tamper-evident label of the present invention.

It should be appreciated that the present invention is not limited to the above-described embodiments and that changes and modifications can be made by one ordinarily skilled in the art without deviation from the scope of the invention, as will be defined in the appended claims. For example one can contemplate the use of the above-described tamper-evident tape not only for sealing of security envelopes but also for sealing of a suitcase or any other luggage. Instead of elongated tape one can use a label attachable to the suitcase or to its handle as shown in FIG. 12. The tape or label can be used, for example, for the sealing of a box or a package for CD as shown in FIGS. 13, 14. The particular shape of the label can be round or polygonal, for example triangular or rectangular, and the protective layer may be attached or welded in the particular shape thereof.

It should also be appreciated that the features disclosed in the foregoing description, and/or in the following claims, and/or in the accompanying examples, and/or in the accompanying drawings may, both separately and in any combination thereof, be material for realizing the present invention in diverse forms thereof.

What is claimed is:

1. A tamper evident tape or label, for sealing or labeling items, to include security envelopes, bags, packages, markings, and price tags comprising:

(a) a base layer made of a pliable light transmissive plastic material, said base layer provided with an upper face and an opposing bottom face;

(b) a security pattern printed on the bottom face of said base layer;

(c) a color layer covering said security pattern to ensure said pattern is imperceptible when the tape or label is intact and said pattern becoming perceptible during an attempt to remove the tape or label from the item;

(d) at least one cut from the security pattern through the base layer adapted to cause disruption of said base layer during an attempt to remove the tape or label from the item;

(e) an adhesive layer placed on said color layer;

(f) a release liner covering said adhesive layer readily removable to expose the adhesive;

(g) a covering layer which is locally connected to the upper face of said base layer, said covering layer prevents direct access to said base layer so as to prevent removing of said base layer from the item together with the security pattern.

2. The tamper-evident tape or label as defined in claim 1, in which said base layer is made of translucent plastic material and said tamper-evident means comprise a security pattern printed on the bottom face of the base layer, said security pattern being covered by a colored layer so as to ensure that the pattern is imperceptible when the tape or label is intact and said pattern becomes perceptible during an attempt to remove the tape or label from the item and said preventing means comprises a covering layer attachable to the upper face of said base layer so as to prevent removing of said bottom layer from the item together with the security pattern.

3. The tamper-evident tape or label as defined in claim 2, in which said covering layer is locally connected to the upper face of said base layer.

4. The tamper-evident tape or label as defined in claim 3, in which the bottom face of said base layer is covered with an adhesive, said adhesive being covered by a release liner which is readily removable to expose the adhesive.

5. The tamper-evident tape or label as defined in claim 4, in which said adhesive is a rubber-based glue and said release liner is made of siliconized paper.

6. The tamper-evident tape or label as defined in claim 4, in which said tamper-evident means comprise void regions cut through the base layer, said void regions adapted to cause disruption of said base during an attempt to remove the tape or label from the item.

7. The tamper-evident tape or label as defined in claim 1, in which said bottom layer is made of low density cast polymer.

8. The tamper-evident tape or label as defined in claim 1, in which said base layer is made of low density blown polymer.

9. The tamper-evident tape or label as defined in claim 7, in which said bottom layer is made of polyethylene and said covering layer is made of a material chosen from the group comprising polypropylene, polyethylene or PVC.

10. The tamper-evident tape or label as defined in claim 7, in which said covering layer is made of bi-oriented or mono-oriented polymer.

11. The tamper evident tape or label of claim 1 wherein the covering layer is provided with a graphic pattern.

12. The tamper evident tape or label of claim 1 wherein the base layer and the covering layer are manufactured from a blown polymer film configured as a sleeve and wherein one half of the sleeve constitutes the base layer and wherein the opposite half of the sleeve constitutes the protective layer.

* * * * *

UNITED STATES PATENT AND TRADEMARK OFFICE
CERTIFICATE OF CORRECTION

PATENT NO.     : 6,447,015 B1                                       Page 1 of 1
DATED          : September 10, 2002
INVENTOR(S)    : Ron Linnewiel It is certified that error appears in the above-identified patent and that said Letters Patent is hereby corrected as shown below:

<u>Column 6,</u>
Lines 9-57,

Please cancel claims 2-10 as published and substitute therefor the following claims 2-10:

2. The tamper-evident tape or label of claim 1, in which said base layer is made of translucent plastic material.

3. The tamper evident tape or label of claim 1, in which said adhesive is made of rubber based glue or rubber based self adhesive.

4. The tamper-evident tape or label of claim 1, in which said release liner is made of siliconized paper or plastic film.

5. The tamper evident tape or label of claim 1, in which said covering is locally connected to the upper side base layer through the use of welding distributed in several locations along the tape.

6. The tamper evident tape or label of claim 1, in which said covering is locally connected to the upper side of said base layer through the use of welding distributed longitudinally and laterally in several locations along the tape.

7. The tamper-evident tape or label of claim 1, in which the opposing bottom face of base layer is made of low density cast polymer.

8. The tamper-evident tape or label of claim 1, in which said base layer is made of low density blown polymer.

9. The tamper-evident tape or label of claim 7, in which said base layer is made of polyethylene and said covering layer is made of polypropylene or polyethylene or PVC.

10. The tamper-evident tape or label of claim 7, in which said base layer is made of bi-oriented or mono-oriented polymer.

Signed and Sealed this

Twenty-first Day of October, 2003

JAMES E. ROGAN
*Director of the United States Patent and Trademark Office*